United States Patent [19]

Ryan

[11] Patent Number: 4,563,793
[45] Date of Patent: Jan. 14, 1986

[54] FRESH SALMON-CLEANING MACHINE

[76] Inventor: Robert M. Ryan, 312 NW. 40th St., Seattle, Wash. 98107

[21] Appl. No.: 663,873

[22] Filed: Oct. 23, 1984

Related U.S. Application Data

[63] Continuation of Ser. No. 347,840, Feb. 11, 1982, abandoned.

[51] Int. Cl.⁴ .............................................. A22C 25/14
[52] U.S. Cl. ...................................................... 17/58
[58] Field of Search ........................... 17/45, 52, 53–58

[56] References Cited

U.S. PATENT DOCUMENTS

| | | | |
|---|---|---|---|
| 753,722 | 3/1904 | Manula et al. | 17/58 |
| 1,119,104 | 12/1914 | Mohr | 17/65 |
| 1,217,809 | 2/1917 | Nicholson | 17/58 |
| 2,536,826 | 1/1951 | Taus | 17/65 |
| 2,832,988 | 5/1958 | Schlichting | 17/45 |
| 2,917,772 | 12/1959 | Schlichting | 17/55 |
| 3,925,846 | 12/1975 | Leander | 17/58 X |
| 4,056,866 | 11/1977 | Wenzel | 17/57 |
| 4,336,634 | 6/1982 | Braeger | 17/57 |

FOREIGN PATENT DOCUMENTS

194101  1/1965  Sweden .................................. 17/58

*Primary Examiner*—Willie G. Abercrombie
*Attorney, Agent, or Firm*—Dowrey & Cross

[57] ABSTRACT

Horizontal conjointly moving endless belts have adjacent stretches disposed in parallel vertical planes to transport a beheaded fish clamped between them successively past a rotating circular belly slitter disc, an eviscerating gutter, a rotating kidney-slitting blooder disc, spray nozzles for scouring the eviscerated fish cavity, a rotating slimer brush which removes the kidney and a fish cavity washing assembly. A slitter guard protrudes into the fish cavity ahead of the slitter disc for holding the skin on the underside of the fish in the path of the slitter disc. Such slitter guard is rounded so that the tail end of the belly cavity rides up on the guard to prevent the slitter disc from cutting the bottom portion of the fish beyond its vent. The gutter engages the beheaded fish between its backbone and the majority of the viscera to scoop the viscera out of the cavity as the fish is moved over the gutter by the belts. The rotary blooder disc carries replaceable blades which have sharp edge portions extending beyond the periphery of the disc for cutting open the kidney membrane of the fish. The spray nozzles discharge fan-shaped sprays and are mounted in countersunk bores of a visceral spray assembly. The cavities and nozzles are positioned so that the nozzles spray water throughout 360° to scour the eviscerated fish cavity thoroughly without the nozzles becoming clogged.

13 Claims, 11 Drawing Figures

Fig. 1.

FRESH SALMON-CLEANING MACHINE

BACKGROUND OF THE INVENTION

1. Field of the Invention

This is a continuation of application Ser. No. 347,840, filed Feb. 11, 1982, now abandoned.

The present invention relates to fish-cleaning machines. More particularly, it relates to machines for removing the viscera, including kidneys, of beheaded fresh salmon.

Fish, particularly salmon, being to deteriorate in a couple of hours after being caught, which causes the flesh of the fish to become less firm and resilient. Since salmon is a delicacy sold in fish markets in an unblemished fresh or frozen condition with the head removed and the visceral cavity cleaned, it is desirable to transfer the freshly caught salmon from the small fishing boats in remote areas to larger ships on which the fish is processed. On board the processing ships deterioration of the fish is slowed by cleaning the fresh fish, i.e. removing the entrails of the fish, and refrigerating them by icing, i.e. layering the fish in ice, or freezing. By eviscerating the fish prior to icing or freezing, the amount of the material to be refrigerated is reduced and additional internal surfaces of the fish cavity are exposed to expedite chilling.

Prior to the present invention, salmon was processed for the fresh fish market on board the processing ships or on shore by manually cleaning the fish and then freezing or icing them. These operations were necessary to preserve the quality and value of the salmon meat. Since fresh salmon is normally cooked whole or in steaks cut transversely from the fish it is typically sold whole, that is, with the visceral cavity cleaned and normally the head removed forward of the collarbone, or in chunks of the cleaned salmon. Salmon which are to be canned are beheaded behind the collarbone.

2. Prior Art

The salmon-cleaning machine shown in Oates et al. U.S. Pat. No. 3,456,287 cleans salmon, which has had its head and collarbone removed, by securing the fish to the periphery of a bull ring. As the fish is carried by the rotating bull ring, the belly fin and back fin are cut off, the belly is slit, the entrails are removed, the blood sack attached to the backbone is scraped out, and the walls of the belly cavity are brushed clean. Since the Oates et al. machine is large and of considerable height, it usually is not feasible to install it on a salmon-processing ship.

Furthermore, since the Oates et al. machine is designed for cleaning fish which are to be canned, it is of little consequence that the means for securing the fish to the bull ring include flesh-piercing pins which penetrate into the tail and back of the fish, thereby mutilating it, or that the slitter cuts open the belly of the fish into the meat behind the vent of the fish. Such defects would drastically reduce the value of the fish for sale in the fresh fish market. Also, the roe of female fish are damaged during the cleaning process and discarded.

The fish-beheading and cleaning machine shown in the Oates U.S. Pat. No. 3,469,278 is designed to behead and clean frozen tuna fish which are to be cooked and canned. Although it includes an in-line type of cleaning machine, this Oates machine could not effectively clean fresh salmon. Wedging a fresh salmon between the clamping plates of the Oates fish holder tightly enough to hold the resilient body of a fresh salmon would damage the fish. Also slitting open the belly of such a clamped fresh fish would relieve the pressure which holds the fish in the clamps, thereby allowing it to slip out of the clamps. This does not happen with the frozen tuna for which the Oates machine is designed because tuna fish have a much thicker body than salmon and the frozen tuna meat is not as resilient as is fresh salmon meat. Further it is more difficult to eviscerate fresh fish in the belly-up position as is done with the frozen tuna by the Oates machine since the slippery fish entrails would be difficult to lift out of the visceral cavity.

The LaPine et al. U.S. Pat. No. 3,303,526 describes an in-line fish-filleting machine which includes two horizontal conjointly moving endless belts having adjacent stretches disposed on opposite sides of the machine center line to grip fish between them and move such fish through the machine. However, salmon is a large, premium gourmet fish which is not filleted before being sold in a fresh fish market. Rather than cutting fillets from the sides of the fish, salmon is merely beheaded, the belly slit to the vent and the visceral cavity cleaned resulting in an unblemished whole fish.

SUMMARY OF THE INVENTION

It is the principal object of the present invention to provide a fish-cleaning machine which will effectively and efficiently clean fresh beheaded salmon.

The fresh salmon-cleaning machine of the present invention includes two horizontal endless belts having conjointly moving parallel stretches which transport beheaded salmon held between them neck first with their bellies down past a slitter which cuts open the belly of the fish to its vent, a gutter which eviscerates the fish, a blooder which cuts open the kidney membrane at the upper wall of the visceral cavity and cleaning means which cleans the visceral cavity. The machine is compact for use aboard ship and efficiently cleans the fresh salmon without damaging the fish and without requiring the intensive manual labor presently used to clean salmon to be sold in fresh fish markets.

A further object is to provide such a machine with a projection immediately forward of a rotating slitter disc which will enter the fish cavity and hold the flabby belly wall of the fresh salmon for more effective operation of the slitter to slit open the fish belly.

An additional object is to provide such a machine which will slit open the belly of the salmon to the end of its cavity but not beyond the vent.

Another object is to provide such a machine which will slit open the belly of the salmon and remove the roe of female fish without damage.

It is also an object to provide a fish-cleaning machine with a stationary gutter which will effectively eviscerate fish.

Another object is to provide a fish-cleaning machine which includes a blooder that entirely cuts the kidney membrane of the fish so that the kidney may be removed by brushing and washing.

An additional object is to provide such blooder with blades which are adjustable and replaceable.

A still further object is to provide a fish-cleaning machine which has spray nozzles that will scour or flush the surfaces of the fish cavity without becoming clogged with visceral debris.

DETAILED DESCRIPTION

Figure 1:
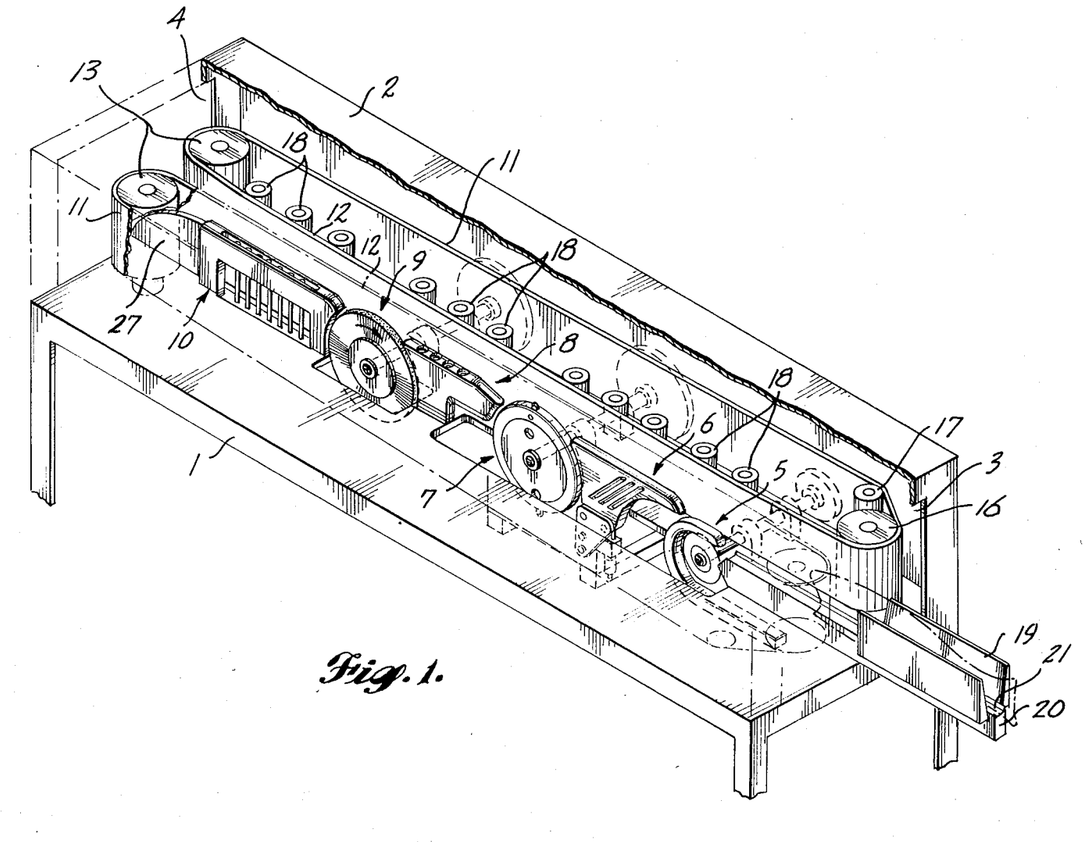
FIG. 1 is a top perspective of the fish-cleaning machine of the present invention, parts being broken away.

As shown in FIG. 1, the fish-cleaning apparatus of the salmon-cleaning machine is supported by an elongated base 1 and enclosed by cover 2 which has an inlet opening 3 and an outlet opening 4. The fish to be cleaned is beheaded and placed at the inlet end of the transport mechanism of the machine in a horizontal position with the belly down, beheaded end first. The transport mechanism moves the fish past a rotary slitter 5 which cuts open the belly of the fish, gutter spear 6 which eviscerates the fish, rotary blooder 7 which slices open the kidney membrane of the fish, spray assembly 8, rotary brush 9 which brushes out the kidney and remains of the viscera, and washing assembly 10 which scours or flushes the eviscerated cavity.

Figure 3:
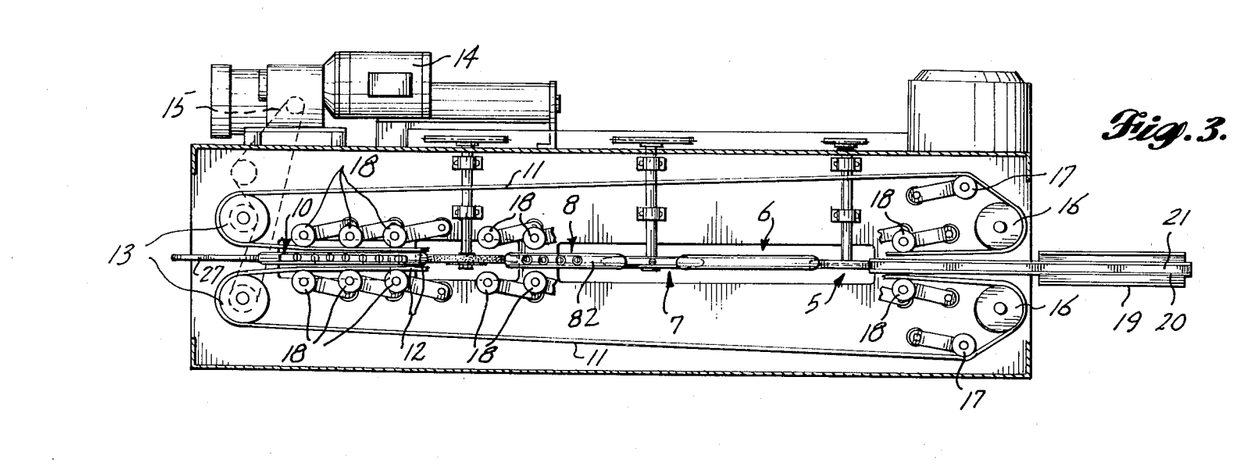
FIG. 3 is a plan of the machine.

The transport mechanism, best shown in FIGS. 1 and 3, includes two horizontal endless belts having adjacent laterally spaced conjointly moving stretches 12 disposed on opposite sides of the cleaning apparatus. Each belt is mounted and driven by an identical set of rollers which are symmetrically arranged on opposite sides of the cleaning machine center line as best shown in FIG. 3. The rollers include drive rollers 13 which are driven by drive motor 14 through drive belt 15, idler rollers 16, belt-tightening rollers 17 and spring-biased backing rollers 18.

Salmon in the round which are to be cleaned are beheaded and placed in trough 19 in a horizontal position with the belly down resting on rail 20 with the beheaded end positioned adjacent to the machine inlet opening 3. As best shown in FIGS. 1 and 3, the rail 20 includes a groove 21 in its upper surface to support the lowermost portion of the fish belly. The beheaded salmon is manually slid along the rail 20 until its sides are engaged by the adjacent parallel stretches of the endless belts at the inlet opening, at which point the endless belts move the fish through the cleaning machine past the successive components of the cleaning apparatus.

Figures 5, 10:
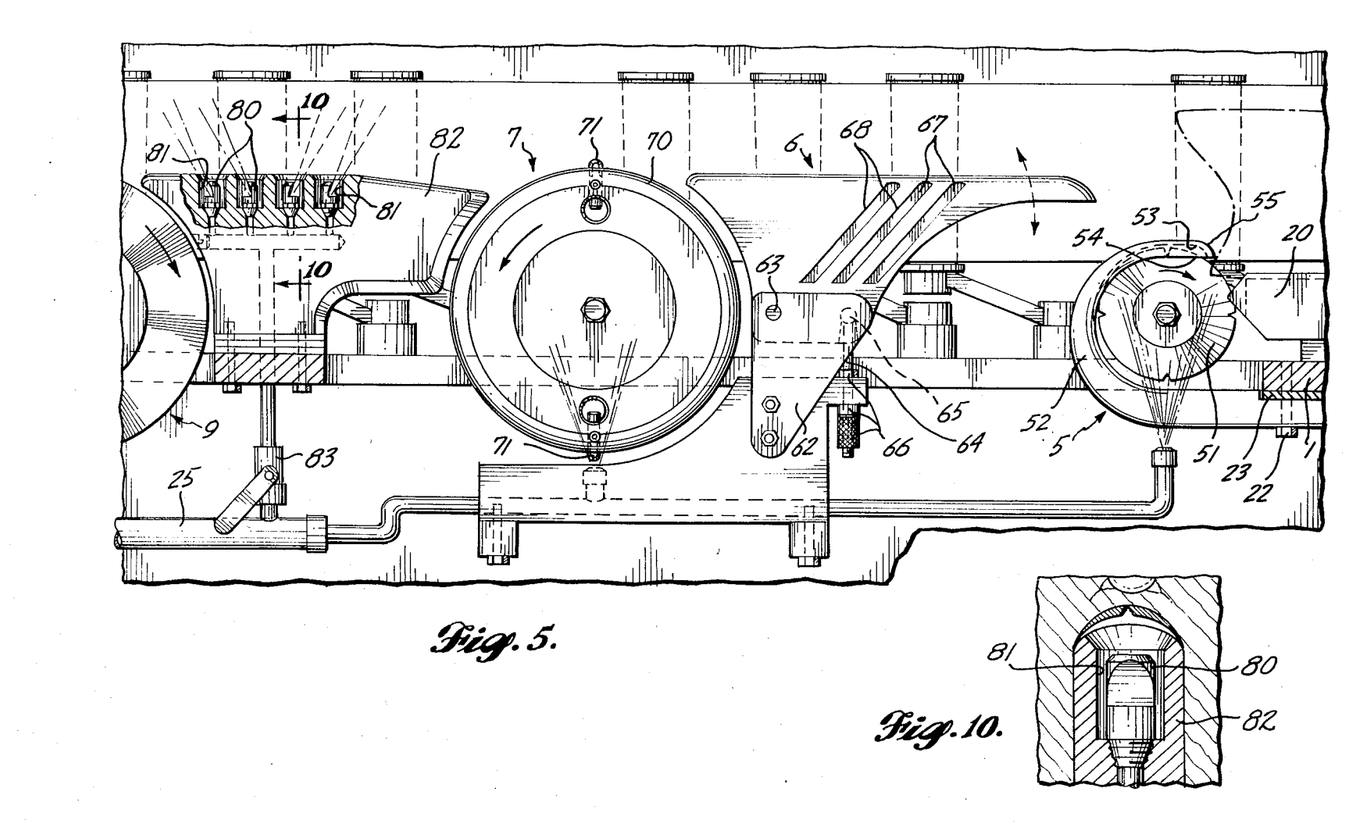
FIG. 5 is a further enlarged side elevation.
FIG. 10, on the drawing sheet with FIG. 5, is a section taken along line 10—10 of FIG. 5.
Figures 6, 7:
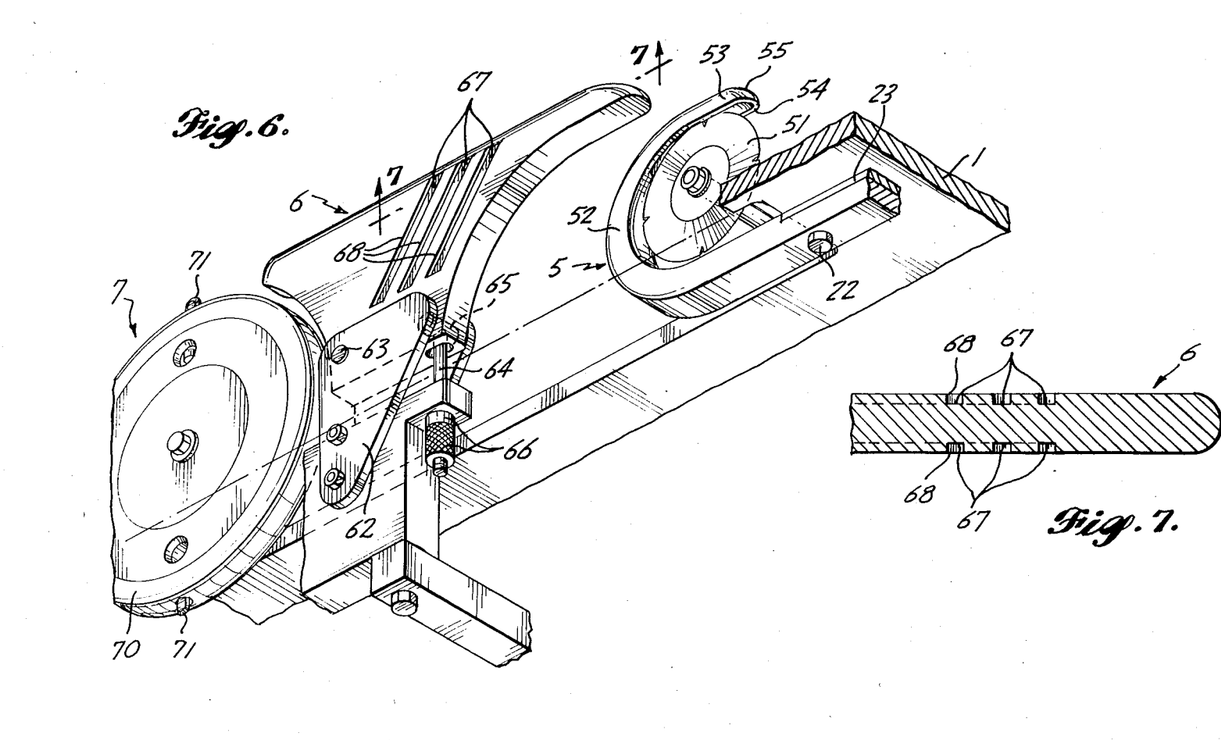
FIG. 6 is a bottom perspective of the slitter, gutter and blooder of the machine, parts being broken away.
FIG. 7 is a section taken along line 7—7 of FIG. 6.

As shown in FIG. 5, the slitter 5 includes a notched rotating slitter disc 51 which is similar to the discs 61 at the ventral cutting station 20 of the LaPine et al. machine. However, the slitter disc 51 of the present invention is located within the hollow arcuate portion of a J-shaped guard 52. Referring to FIGS. 5 and 6, the upper hollow portion of the guard 52 is positioned so that the upper periphery of the slitter disc 51 is shielded by the guard. The guard is mounted by securing the guard anchor shank to the upper surface of the base 1 by bolts 22 (see FIG. 5). The upper tip portion of the guard has a projecting finger 53 extending tangentially beyond the periphery of the slitter disc toward the oncoming fish and substantially parallel to the guard anchor shank and the direction of fish movement in which the belts feed the fish. As the fish is moved along rail 20 by the continuous belts 11 toward the slitter disc, the fish cavity slides over the projection before the belly of the fish is engaged by the slitter disc.

The location of the guard 52 relative to the slitter disc 51 and the rail 20 is determined by the thickness of shims 23. The guard is positioned so that its projection 53 extends into the belly cavity above the cavity wall on the underside of the fish belly and below the major portion of the viscera within the belly cavity. Therefore, as the fish passes over the slitter disc the lower wall of the fish belly is held in the path of the slitter disc so that it is effectively cut. Since the belly of the fresh salmon is resilient, it would tend to be pushed up by the slitter disc without as much assurance of being cut as when the cavity wall immediately ahead of the slitter disc is held down by the projection 53.

Also, since the cutting portion of the slitter disc is located within the hollow arcuate portion of the guard and the guard projecting finger extends into the belly cavity below the major portion of the viscera, the viscera, and particularly the roe of female fish, ride over the guard projecting finger and upper portion of the guard which shield the viscera and roe from the slitter disc beneath the guard. The roe may be separated from the viscera after it has been removed from the fish cavity. As shown in FIG. 15 of LaPine et al., the unprotected discs 61 cut half the height of the fish and therefore slice through the viscera and roe.

Figure 4:
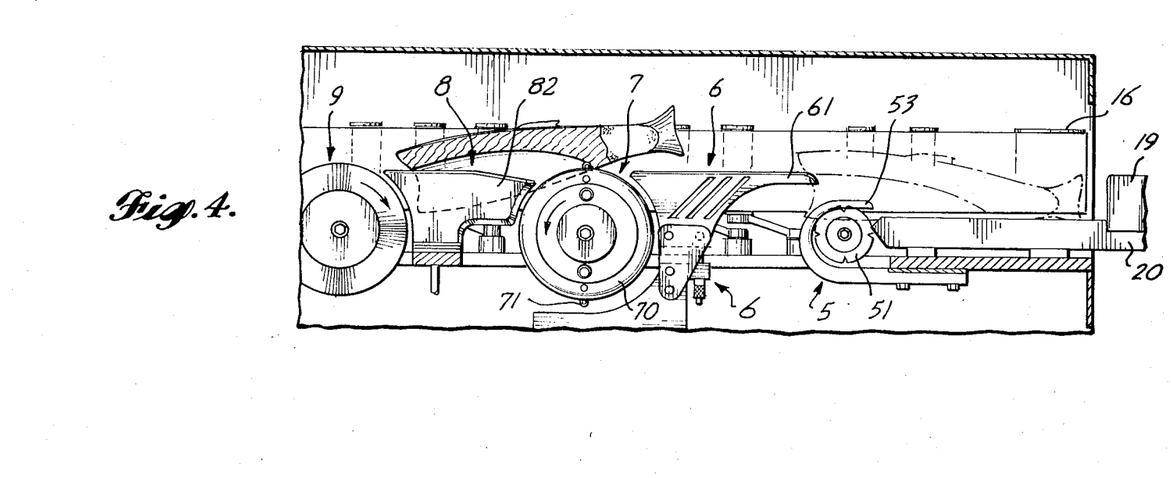
FIG. 4 is an enlarged side elevation, illustrating the progress of a fish past the slitter, gutter, blooder and spray nozzles.

Further, since the projecting portion 53 of the guard has a substantially planar surface 54 on its underside adjacent to the slitter disc and an upper convex surface 55, not only does it protrude into the fish cavity before the belly of the fish is engaged by the slitter disc, but, as shown in FIG. 4, the tail end of the belly cavity adjacent to the vent rides up on the convex upper surface of the guard lifting the tail portion of the fish and thereby preventing the slitter disc from cutting the bottom portion of the fish beyond the fish vent. On the contrary as shown in FIG. 15 of LaPine et al., the discs 61 slit open the fish throughout its length.

Figure 2:
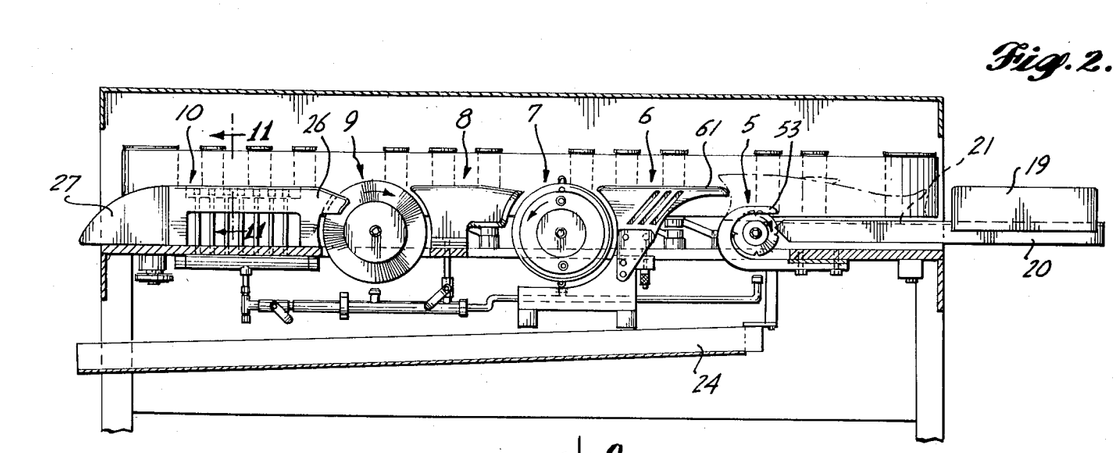
FIG. 2 is a side elevation of the machine.

As shown in FIGS. 2 and 4, while the rear portion of the belly of the fish is still being cut by the slitter disc, the continuous belts move the forward portion of the fish over the stationary gutter 6. Rather than being a rotary wheel having peripheral grooves as in the LaPine et al., Oates et al. and Oates patents, the stationary gutter of the present invention has a projecting end portion 61 directed toward the approaching fish substantially parallel to the direction in which the fish is moved by the belts 11 which penetrates into the fish cavity and causes the upper wall of the fish cavity to ride on the upper surface of the gutter spear. As shown in FIG. 2 the projecting end portion 61 of the gutter spear is located adjacent to the upper wall of the fish cavity beneath its backbone. As the fish slides along the gutter its projecting end 61 scoops the viscera out of the cavity through the slit belly. The expelled viscera drop between the slitter disc 5 and gutter 6 into the discharge trough 24.

Since, as best shown in FIG. 4, the upper wall of the fish cavity rides on the gutter projecting end portion 61, the elevation of such end portion should be adjustable to enable the gutter to clean the cavity of fish of different sizes effectively. To enable such adjustment the rearward portion of the gutter is pivotally mounted by a pin 63 received in a mounting bracket 62 (see FIG. 6). The forward end of the gutter can be swung up and down within a limited range about pivot pin 63 by varying the effective length of a thrust screw 64 connected by a wrist pin 65 to the forward portion of the gutter spear. To swing the projecting end portion 61 up, the locking nuts 66 which lock the screw in place (see FIG. 5) are loosened and a nut is rotated to shift the thrust rod 64 lengthwise upward.

Referring to FIGS. 6 and 7, downwardly inclined grooves 67 are cut into the opposite sides of the gutter to expose sharp corner-shaped upper scraping edges 68 to the side walls of the fish belly cavity. As the belts 11 move the fish past the gutter, the sides of the cavity are pressed against the gutter side surfaces by the spring-biased backing rollers 18 adjacent to the gutter 6, causing the cavity to be scraped clean by the sharp trailing edges 68 of the grooves 67.

Figures 8, 9:
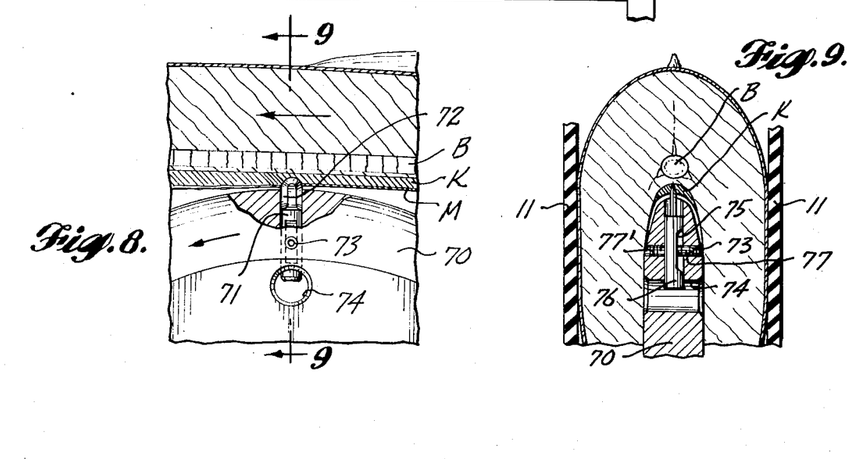
FIG. 8, on the drawing sheet with FIG. 2, is a blooder blade and a portion of a fish being cleaned.
FIG. 9, on the drawing sheet with FIG. 2, is a section taken along line 9—9 of FIG. 8.

As the eviscerated fish leaves the gutter, it is moved by the continuous belts to the blooder 7 which includes a rotating disc 70. The upper half of the blooder rotates in the direction of belt movement to reduce drag on the fish as it passes the blooder. As shown in FIG. 8, the sharp edge 72 of each blade 71 projects beyond the periphery of the blooder so that as the salmon is moved past the blooder disc the blades cut the kidney membrane M lying beneath the backbone B and a portion of the kidney K of the fish but does not penetrate to the backbone B.

Each blade 71 is adjustable in height and replaceable, being slidably received in a radial blind bore in the disc 70. By loosening set screw 73, the blade is freed to slide lengthwise in its bore and the degree of radial projection manually through access hole 74 may be adjusted or the blade replaced. The blade is then again fixed by resetting the screw to press against the flat 75 of blade shaft 76 (see FIG. 9). The entire semicircular end portion of the blade may be sharpened as shown in FIG. 8 and tapped set screw bores 77 and 77' may be provided in opposite sides of the blooder disc 70 so that the blade may be secured in oppositely turned positions. When the edge on one side of the blade becomes dull the set screw 73 may be removed, the blade 71 turned 180° about its longitudinal axis extending radially of the axis of rotation of disc 70 to present a new cutting edge and the set screw screwed into the opposite tapped bore to lock the blade in place.

The fish is shown at the left of FIG. 4 being flushed by the spray assembly 8 as it is moved past the blooder 7. As shown in FIGS. 5 and 10, the spray nozzles 80 are mounted in countersunk bores 81 of rail 82 which supports the fish and comprises the body of the spray assembly. Each of the spray nozzles is constructed to spray water in a fan shape and the plurality of spray nozzles are positioned within the bores so that the nozzles collectively spray water through 360° so that, as the cavity of the eviscerated fish passes over the rail 82, the cavity is thoroughly scoured. Since the nozzles are fully within the countersunk bores having their upper surfaces below the surface of rail 82, they do not scrape the fish cavity and become clogged with visceral debris. Water is supplied to the spray nozzles through manifold 25 and stop valve 83.

Figure 11:
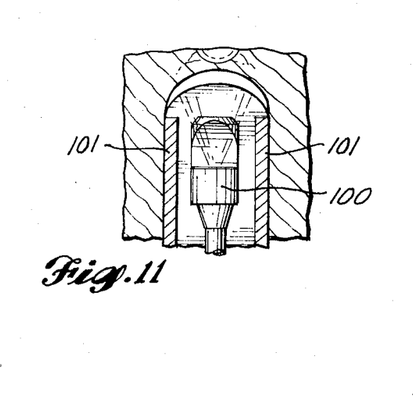
FIG. 11, on the drawing sheet with FIG. 2, is a section taken along line 11—11 of FIG. 2.

After the cavity is scoured of debris, the continuous belts 11 move the fish over the rotating brush 9 which rotates in a direction opposite the direction of belt movement and brushes out the kidney from behind the kidney membrane that has been slit open by the blooder and any viscera which was not flushed out by the spray assembly. The fish then passes over rail 26, shown in FIG. 2, which encloses washing nozzles 100 of washing assembly 10. As shown in FIG. 11, the rail includes two spaced vertical side walls 101 between which the nozzles 100 are located. The upper ends of the washing nozzles are positioned below the upper surface of the rail so that the nozzles will not scrape the fish cavity walls and become clogged. Similar to the spray nozzles, the washing nozzles produce a fan-shaped spray which are directed in various directions throughout 360°.

The manifold 25 supplies water to the washing assembly 10 as well as to the slitter 5, the blooder 7, the spray assembly 8 and the rotary brush 9. The runoff from the various sprays wash the discharged viscera along the inclined discharge trough 24.

The rail 27 following the washing assembly 10 is curved so that a fish which has been eviscerated, had its kidney removed and has been thoroughly washed will fall onto a takeoff conveyor or into a receiving bin on being discharged from the cleaning machine by the continuous belts.

I claim:

1. In a machine for cleaning beheaded fish including fish-cleaning apparatus having arranged sequentially a rotating slitter disc for slitting open the belly of the fish, and an eviscerating gutter for eviscerating the fish, a rotating blooder disc for cutting open the kidney membrane, and belly cavity scouring means to clean the belly cavity; and elongated transport means having two conjointly moving endless belts with adjacent substantially horizontal stretches disposed in substantially parallel vertical planes spaced apart to hold a fish therebetween and move it through the fish-cleaning apparatus beheaded and first in belly down attitude; the improvement comprising:

a slitter disc guard overlying the slitter disc and having a portion extending generally tangentially beyond the slitter disc and in the path of the portion of the belly cavity below the viscera for protrusion into the belly cavity along the belly wall before the belly wall of the fish is engaged by the slitter disc, thereby holding the belly wall for engagement by the slitter disc, said guard being engageable by the tail end of the belly cavity adjacent to the vent of the fish to lift the tail portion of the fish by riding up on said guard to prevent the slitter disc from cutting the bottom portion of the fish tailward of the belly cavity;

a projection projecting from the gutter toward the slitter disc for penetration into the upper portion of the belly cavity adjacent the backbone for scooping the viscera out of the cavity;

said blooder disc being positioned to engage the belly cavity of the fish and having a cross-sectional profile adapted for supporting the side and upper walls of the belly cavity; and a blade carried by the blooder disc and having a sharp edge portion projecting beyond the periphery of the disc for cutting open the kidney membrane in the upper portion of the fish cavity supported by said rotating disc.

2. The fish-cleaning machine defined in claim 1, wherein the slitter disc guard includes a surface which extends over both sides of the slitter disc and a convex upper surface on its outermost end to enable the tail end of the belly cavity adjacent to the vent to ride smoothly on the slitter guard.

3. In a machine for cleaning beheaded fish including fish-cleaning apparatus having arranged sequentially a slitter means for slitting open the belly cavity of the fish, a stationery eviscerating means for evisceratind the fish, and belly cavity scouring means for cleaning the belly cavity; and elongated transport means having two conjointly moving endless belt with adjacent substantially horizontal stretches disposed in substantially parallel vertical planes space apart to hold a fish therebetween and to move through the fish-cleaning apparatus beheaded end first in belly down attitude, the improvement comprising;

an elongated projection extending from the eviscerating means toward the slitter means for penetration into the upper portion of the belly cavity adjacent to the back bone for scooping the viscera out of the cavity, said projection having a cross-sectional profile adapted to support the side and upper walls of the belly cavity as the fish is moved thereover, mounting means for mounting said eviscerating means for selective vertical adjustment about a horizontal pivot to adjust the elevation of said projection to accommodate fish of varying sizes, and said eviscerating means including sidewalls in contact with the sidewalls of the belly cavity and having grooves formed therein and inclined downwardly in the direction of travel of the fish with the upper edges thereof forming scraping edges for scraping the opposite inner sides of the belly cavity held there against by said endless belts.

4. An apparatus for flushing the belly cavity of an eviscerated forwardly moving fish comprising:

rotary brush means mounted for rotation within the belly wall for contacting the underside of the back bone of a moving fish stationary elongated rail means mounted adjacent to said rotary brush for receiving the moving fish and, for engaging the belly cavity of the fish, said rail means having a cross-sectional profile adapted for supporting the side and upper walls of the belly cavity of the fish as it moves forwardly thereover;

spray nozzles mounted within said rail means for spraying in an outward direction;

said spray nozzles being recessed from the top surface of said rail means; and water supply means for supplying water to said nozzles, whereby said belly cavity is held open during flushing and said nozzles are maintained out of contact with the belly walls to prevent clogging thereof.

5. In a machine for eviscerating a fish without damaging the roe therein, the combination comprising;

transport means contacting the sides of the fish for holding the fish in a generally upright belly-down position and moving the fish in a longitudinal, forward head-first direction parallel to the length of the fish, slitter means mounted in the path of movement of the fish for slitting the belly wall of the fish as it is transported thereover, an elongated infeed support means operatively associated with said transport means, and positioned to contact and support the belly of the moving fish, said slitter means being mounted closely adjacent the inboard terminal end of the support means, whereby the fish belly wall is vertically supported in a position to be contacted by said slitter means at a preselected elevation, a slitter guard overlying the slitter means and having a portion extending beyond the slitter means, above the level of and adjacent to the terminal end of said support means in the path of the portion of the belly cavity below the viscera and roe for protrusion into the belly cavity above the belly wall before the belly wall is engaged by the slitter means, an eviscerating means including an elongated projection extending toward the slitter means for penetration into the upper portion of the fish belly cavity adjacent the backbone for scooping the viscera and roe therefrom for gravity assisted removal from the belly cavity, said projection having a cross-sectional profile adapted to support the side and upper walls of the belly cavity as the fish is moved thereover, and blade means mounted adjacent the end of said eviscerating means opposite said slitter means for cutting open the kidney membrane in the upper portion of the fish cavity as the fish is transported thereover.

6. The combination according to claim 5 wherein;

said transport means comprises conjointly moving endless belts with substantially horizontal stretches disposed in substantially parallel vertical planes spaced apart to hold the fish therebetween without penetration of the fish body.

7. The combination according to claim 5 or 6 wherein;

said slitter means comprises a rotatable slitter disc.

8. The combination according to claim 7 wherein;

said slitter guard extends generally tangentially beyond said slitter disc, and means for selectively setting the vertical distance between said disc guard and said infeed support means to locate the generally tangential portion of the disc guard above the belly wall and below the viscera and roe, said generally tangential portion of the disc guard having a curved surface on the distal end engageable by the tail end of the belly cavity adjacent to the vent of the fish to lift the tail portion of the fish by riding up on the guard to prevent the slitter disc from cutting the bottom portion of the fish tailward of the belly cavity.

9. The combination according to claim 8 including;

mounting means for mounting said eviscerating means for selective vertical adjustment about a horizontal pivot to adjust the elevation of said projection to accommodate fish of varying sizes.

10. Apparatus for slitting the belly wall of a fish from the head end to the vent end to open the belly cavity without damage to the roe therein, the combination comprising;

transport means for holding the fish in a generally upright belly-down position and moving the fish in a longitudinal, forward head-first direction parallel to the length of the fish, slitter means mounted in the path of movement of the fish for slitting the belly wall of the fish as it is transported thereover, an elongated infeed support means operatively associated with said transport means and positioned to contact and support the belly of the moving fish, said slitter means being mounted closely adjacent the inboard terminal end of the support means, whereby the belly wall is vertically supported in a position to be contacted by said slitter means at a preselected elevation, and a slitter guard overlying the slitter means and having a portion extending beyond the slitter means, above the level of and adjacent to the terminal end of said support means, and means mounting said slitter guard such that said slitter guard portion extends in the path of the lower portion of the belly cavity below the viscera and roe for protrusion in the belly cavity above the belly wall before the belly wall is engaged by the slitter means, and eviscerating means downstream of the slitter means mounted for penetration into the upper portion of the belly cavity adjacent the backbone for dislodging the viscera and roe therefrom for removal from the belly cavity.

11. The combination according to claim 10 wherein; said transport means comprises conjointly moving endless belts with substantially horizontal stretches disposed in substantially parallel vertical planes spaced apart to hold the fish therebetween without penetration of the fish body.

12. The combination according to claim 10 or 11 wherein;
said slitter means comprises a rotatable slitter disc.

13. The combination according to claim 12 wherein;
said slitter guard extends generally tangentially beyond said slitter disc, and means for selectively setting the vertical distance between said disc guard and said infeed support means to locate the generally tangential portion of the disc guard above the belly wall and below the viscera and roe, said generally tangential portion of the disc guard having a curved surface on the distal end engageable by the tail end of the belly cavity adjacent to the vent of the fish to lift the tail portion of the fish by riding up on the guard to prevent the slitter disc from cutting the bottom portion of the fish tailward of the belly cavity.

* * * * *

Disclaimer and Dedication

4,563,793.—*Robert M. Ryan*, Seattle, Wash. FRESH SALMON-CLEANING MACHINE. Patent dated Jan. 14, 1986. Disclaimer and Dedication filed Mar. 21, 1986, by the *inventor*.

Hereby disclaims and dedicates to the Public claim 4 of said patent.
[*Official Gazette May 27, 1986.*]